United States Patent
Watanabe

(10) Patent No.: US 8,018,194 B2
(45) Date of Patent: Sep. 13, 2011

(54) OBSERVATION SYSTEM AND OBSERVATION APPARATUS

(75) Inventor: Hiroshi Watanabe, Tokyo (JP)

(73) Assignee: Olympus Corporation, Tokyo (JP)

( * ) Notice: Subject to any disclaimer, the term of this patent is extended or adjusted under 35 U.S.C. 154(b) by 417 days.

(21) Appl. No.: 12/401,044

(22) Filed: Mar. 10, 2009

(65) Prior Publication Data

US 2009/0231691 A1 Sep. 17, 2009

(30) Foreign Application Priority Data

Mar. 12, 2008 (JP) ................. 2008-062401

(51) Int. Cl.
*B64C 17/06* (2006.01)

(52) U.S. Cl. .............. 318/649; 318/567; 318/568.1; 318/38

(58) Field of Classification Search .......... 318/565, 318/567, 568.1, 649, 38, 51, 62, 67, 111, 318/135, 400.17; 359/382, 383, 385, 388, 359/440, 441, 448, 458, 462, 470

See application file for complete search history.

(56) References Cited

U.S. PATENT DOCUMENTS

| | | | | |
|---|---|---|---|---|
| 5,517,353 A | * | 5/1996 | Ikoh et al. | 359/388 |
| 5,703,714 A | | 12/1997 | Kojima | |
| 5,867,310 A | * | 2/1999 | Hasegawa | 359/381 |
| 6,335,603 B1 | * | 1/2002 | Otsuka et al. | 318/571 |
| 6,583,928 B2 | * | 6/2003 | Ooki et al. | 359/388 |
| 6,989,928 B2 | * | 1/2006 | Kawanabe et al. | 359/392 |
| 2003/0127991 A1 | | 7/2003 | Cash et al. | |
| 2006/0232854 A1 | | 10/2006 | Watanabe | |

FOREIGN PATENT DOCUMENTS

| | | |
|---|---|---|
| EP | 1 686 406 A2 | 8/2006 |
| JP | 11-202212 | 7/1999 |
| JP | 2006-195274 | 7/2006 |

OTHER PUBLICATIONS

Extended European Search Report dated Mar. 22, 2011.

* cited by examiner

*Primary Examiner* — Bentsu Ro
*Assistant Examiner* — Thai Dinh
(74) *Attorney, Agent, or Firm* — Scully, Scott, Murphy & Presser, P.C.

(57) ABSTRACT

When application software running on a PC is in the state of being terminated, a switch unit is turned OFF with the control of a CPU and individual motors, and in this state, a light source is not supplied with a motor/lamp-use power source. In this state, however, the CPU and individual I/Fs are supplied with a logic-use power source. Therefore, the switch unit is turned ON when the application software is started, and an initialization process for an individual electrically driven unit is no longer required.

11 Claims, 13 Drawing Sheets

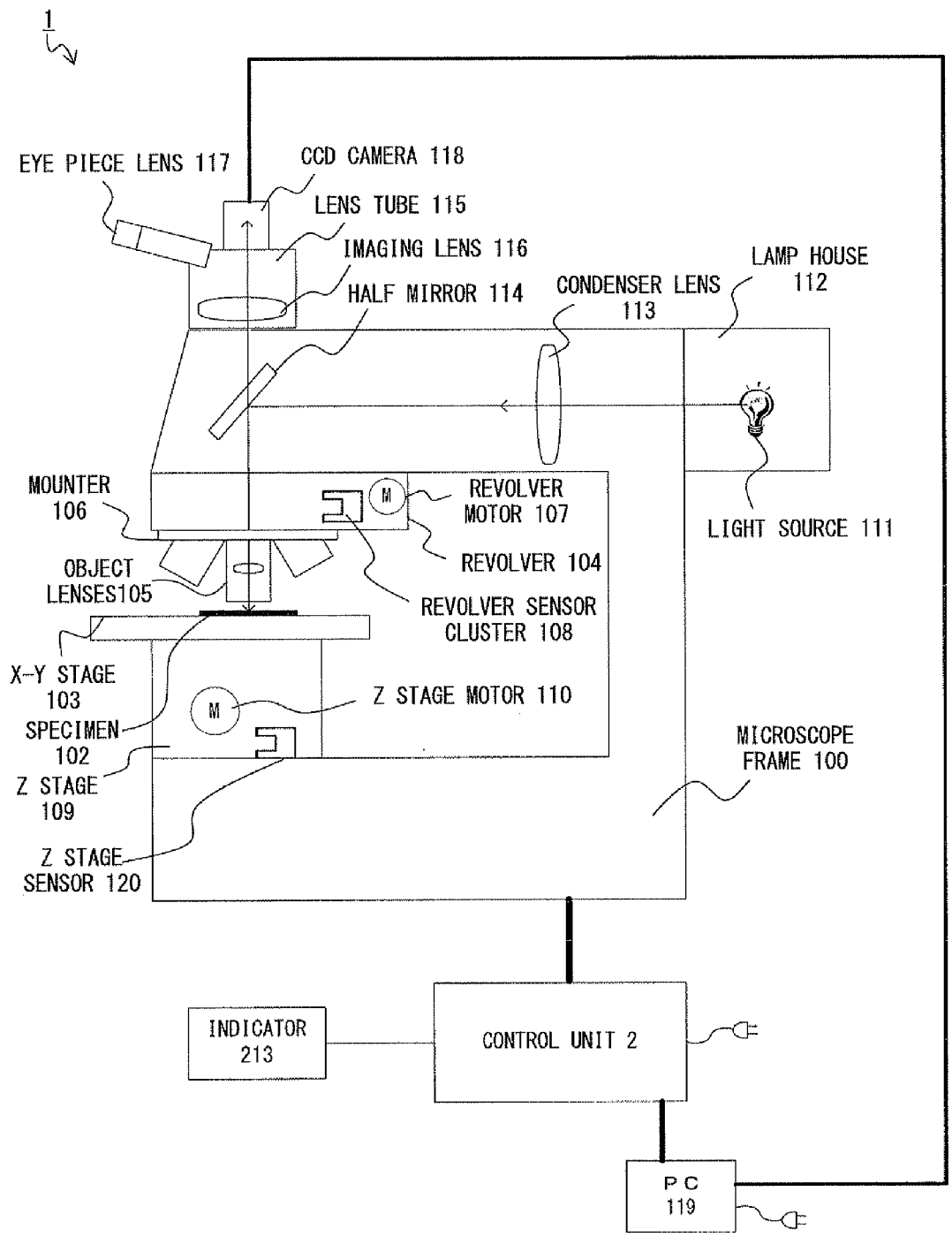
F I G. 1

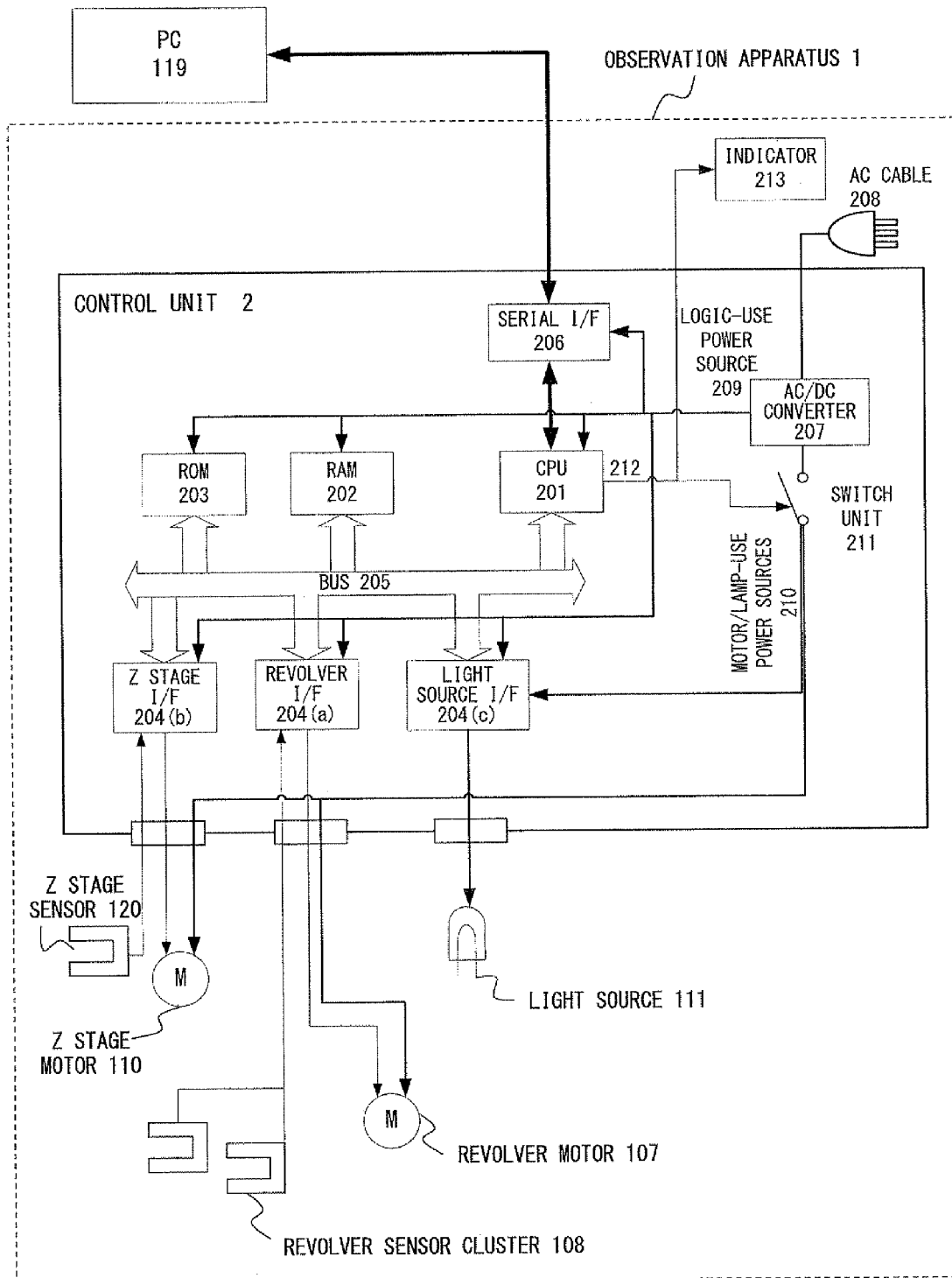
F I G. 2

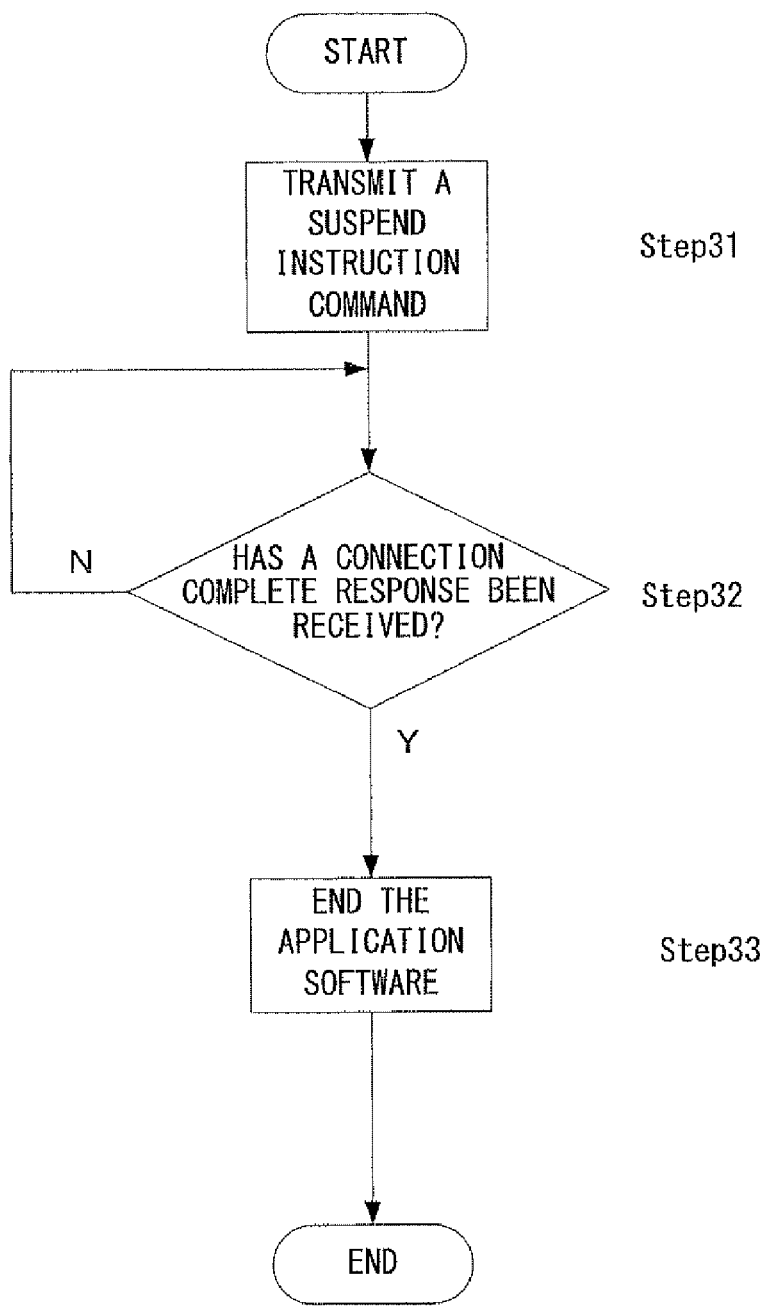
F I G. 7

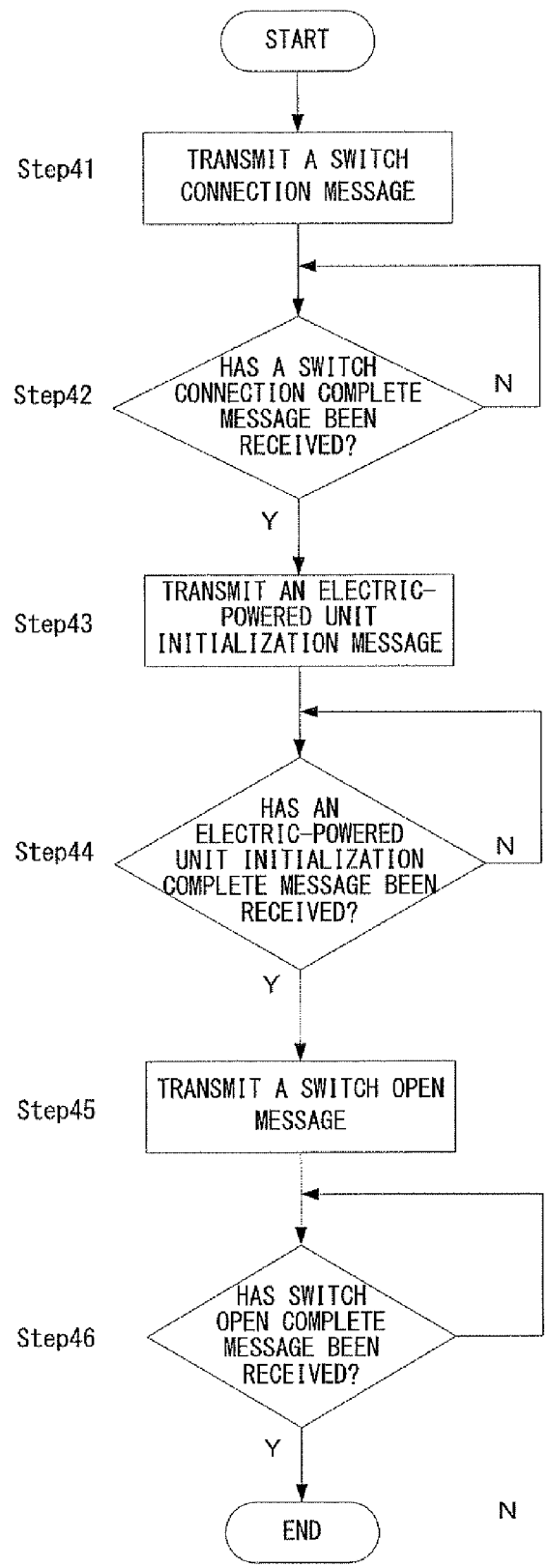
F I G. 9

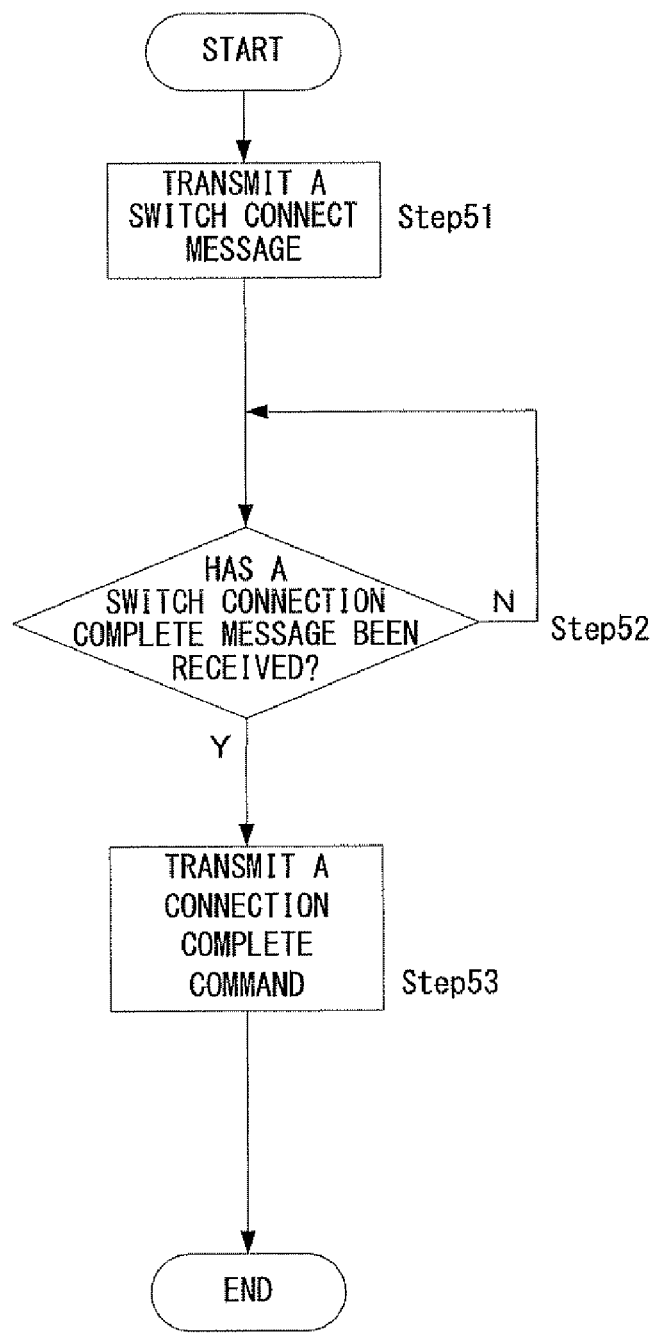
F I G. 10

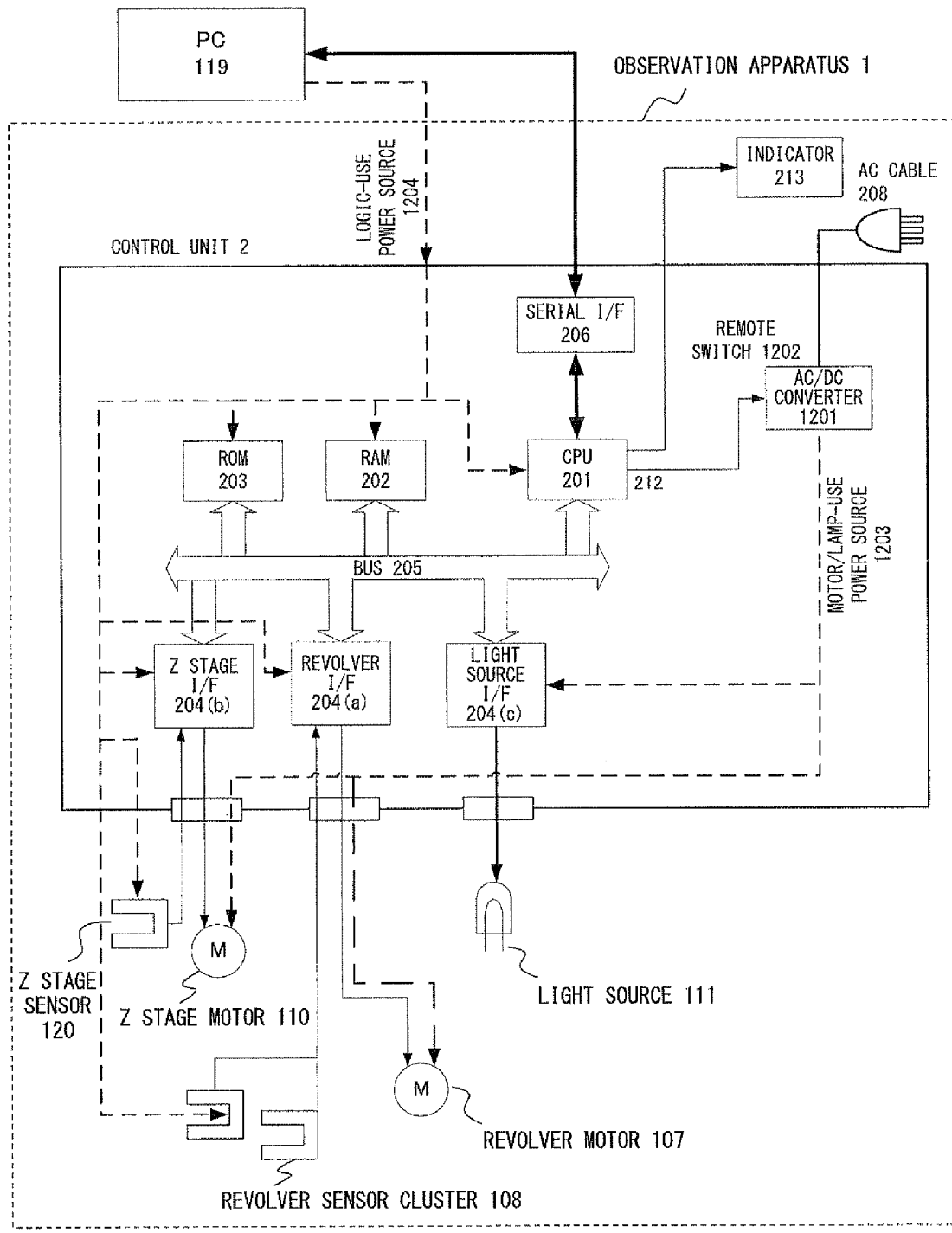
F I G. 1 2

OBSERVATION SYSTEM AND OBSERVATION APPARATUS

CROSS REFERENCE TO RELATED APPLICATIONS

This application claims benefit of Japanese Application No. 2008-062401, filed Mar. 12, 2008, the contents of which are incorporated by this reference.

BACKGROUND OF THE INVENTION

1. Field of the Invention

The present invention relates to an observation apparatus, such as an optical microscope, stereoscopic microscope or video microscope, comprising an electrically driven unit.

2. Description of the Related Art

Observation apparatuses such as optical microscopes, stereoscopic microscopes and video microscopes are widely used in various fields. Usage includes not only medical science and biology, but also the industrial fields spanning from the inspection of IC wafers and magnetic heads to quality control for a metal organization, and finally to the research and development of new materials.

In recent years, observation apparatuses have been increasingly widely used. An example is when a plurality of observers simultaneously observe specimens on the apparatus as well as an enlarged image of the specimen attached to a work document such as a report. An observation apparatus system is becoming a mainstream in which a charge-coupled device (CCD) camera is connected to an observation apparatus so as to display the pickup image on the application software running on a personal computer (PC) and, associated with the aforementioned setup and operation, electrically driven units such as a revolver incorporating an object lens(es) and a Z-stage used for focusing are remotely operated through the application software running on the PC, and thereby the operability is being improved.

In a method for managing the position of the above described electrically driven unit, at least one sensor is equipped in the drive system to manage the position of each electrically driven unit. This is done on the basis of a relative drive amount from a reference position that is defined as the position of one of the equipped sensors. In such a system, however, the current position of the electric-powered drive unit is not known immediately after the power to the observation apparatus is turned on, and therefore the unit needs to be driven once to a reference position so as to recognize the reference position. Consequently, there has been a problem wherein the observer is required to wait a certain period of time between turning the power on and starting to observe a specimen.

It is accordingly conceivable to adopt a method for managing the position of an electric-powered drive unit immediately after turning the power on by means of an absolute encoder or the like. Such a method, however, is faced with problems such as complicating the configuration and increasing the product cost.

For example, Laid-Open Japanese Patent Application Publication No. H11-202212 has disclosed an observation apparatus configured to return an electric-powered drive unit back to a reference position before turning off the power to the present observation apparatus after exiting the application software, thereby making it possible to eliminate the need to carry out an initializing operation at the next startup, or to drastically shorten the initializing operation time.

SUMMARY OF THE INVENTION

An observation system according to the present invention is the observation system comprising an observation apparatus and an operation apparatus, with the observation apparatus and operation apparatus each having a separate power source unit, wherein the operation apparatus comprises an operation unit for remotely controlling the observation apparatus, and the observation apparatus comprises at least one of an electrically driven unit, a control unit for controlling the electrically driven unit, a first power supply line used for supplying the electrically driven unit with electric power from the power source unit, a switch unit which is equipped on the first power supply line and used for turning on or off a power supply to the electrically driven unit, and a second power supply line used for supplying the control unit with electric power from the power source unit, wherein the control unit supplies the electrically driven unit with electric power by turning on the switch unit at startup and executing an initialization process for the electrically driven unit, then stopping the electric power supply to the electrically driven unit by turning off the switch unit, and then controls an on/off changeover of the switch unit in accordance with the state of the operation unit.

BRIEF DESCRIPTION OF THE DRAWINGS

The present invention will be more apparent from the following detailed description when the accompanying drawings are referred to.

FIG. 1 is a diagram showing the overall configuration of an observation apparatus according to preferred embodiments 1 through 3;

FIG. 2 is a diagram showing the electrical configuration of the observation apparatus according to embodiment 1;

FIG. 4 is a flow chart showing the operation of a CPU when the power to an observation apparatus is turned on;

FIG. 7 is a flow chart showing an operation when application software is terminated;

FIG. 9 is a flow chart showing the operation of a main CPU when the power to an observation apparatus according to embodiment 2 is turned on;

FIG. 10 is a flow chart showing the operation of a main CPU when an observation apparatus connection command according to embodiment 2 is received;

FIG. 12 is a diagram showing the electrical configuration of a preferred embodiment 3; and FIG. 13 is a flow chart showing the operation of a CPU when the power to an observation apparatus according to embodiment 3 is turned on.

DESCRIPTION OF THE PREFERRED EMBODIMENTS

Figure 3:
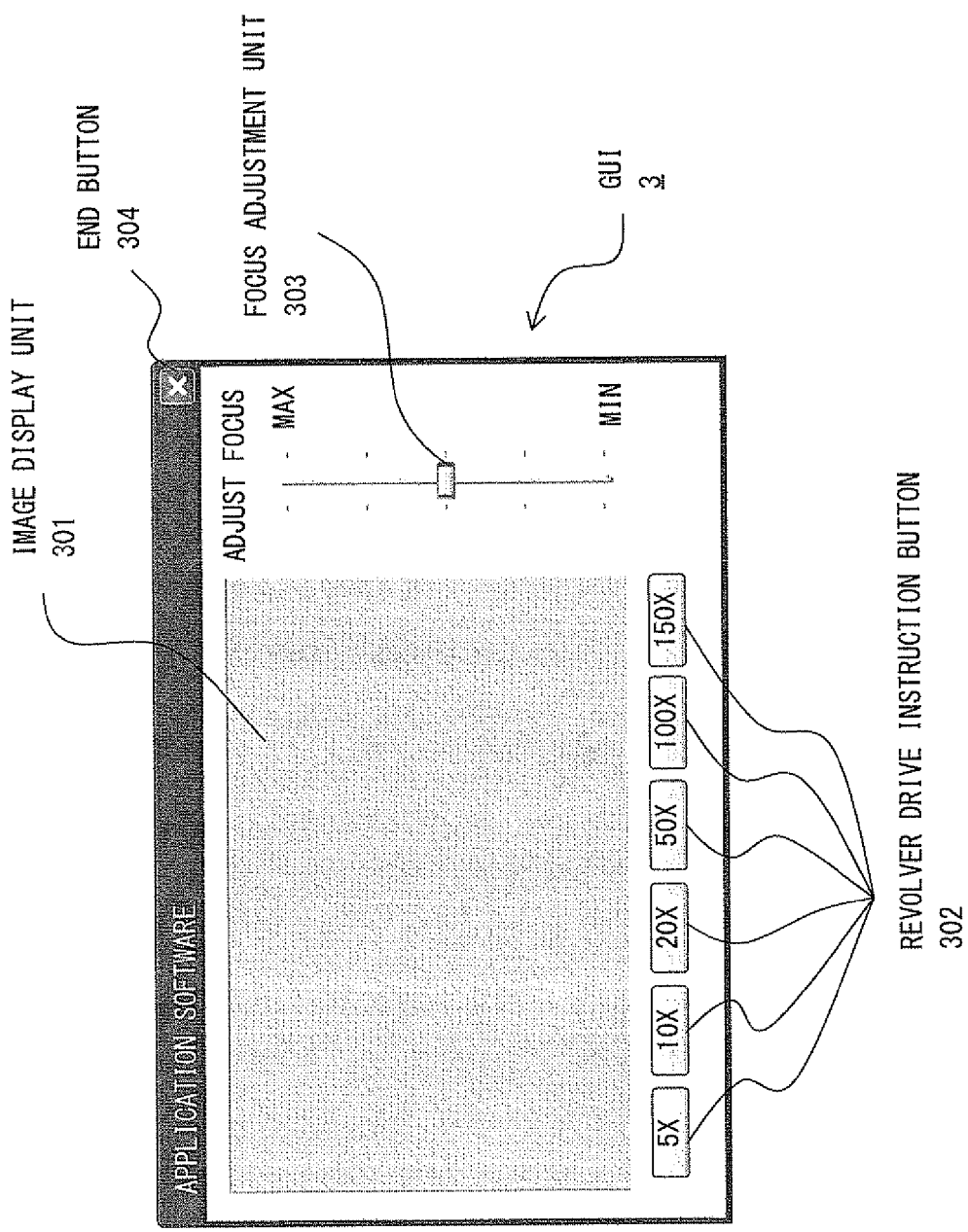
FIG. 3 is a diagram showing the configuration of a graphical user interface (GUI)

The following is a description of the preferred embodiment of the present invention with reference to the accompanying drawings.

Although the conventional method disclosed in the above described Laid-Open Japanese Patent Application Publication No. H11-202212 can solve the problem of the time it takes between turning on the power to an observation apparatus to initialize the application software and being enabled for an observation, there are two power supply systems (i.e., in the PC and observation apparatus) requiring turning on the power for the microscope and then for the PC, which is thus a cumbersome operation required of the observer.

Moreover, when starting the application software with the power to the observation turned off the application software needs to be restarted after turning on the power to the observation apparatus, because it cannot communicate with the observation apparatus. This is also cumbersome for the observer.

The present embodiment provides an observation apparatus in which, for example, the time between initiating application software and starting an observation is shortened so that the observation is enabled when the application software is initiated.

The following is a description of a preferred embodiment 1 (i.e., an exemplary embodiment 1) of the present invention with reference to the accompanying drawings.

FIG. 1 is an outline configuration diagram of an exemplary observation apparatus 1, to which the present method is applied.

Note that observation apparatus 1 may be regarded as the individual configurations shown in FIG. 1, with the exception of the personal computer (PC) 119. Then, a system constituted by the observation apparatus 1 and by the PC 119 is defined as an observation system. Also in the present specification document, "power (or power source)" is meant to be not only "power source" per se, but also "electric power" (or simply "power") supplied from the power source.

The observation apparatus 1 and PC 119 shown comprise power sources, respectively, so that, for example, plugging the respective alternate current (AC) plugs into the respective AC service outlets causes the power to be supplied from the commercial power source(s). In the example shown in FIG. 1, the observation apparatus 1 actually comprises a control unit 2 that is equipped with an AC plug through which the power is supplied to the individual configurations within the observation apparatus 1 (i.e., the control unit 2 and the constituent components, such as a light source 111 and various motors including a Z stage motor 110, all of which require respective supplies of power).

In the observation apparatus 1 shown in FIG. 1, the microscope frame 100 is equipped with a revolver 104 at a position opposite to an X-Y stage 103, allowing a specimen 102 to be mounted upon it. A maximum of six object lenses 105 can be mounted on the revolver 104. Further, the revolver 104 comprises a mounter 106 used for mounting the object lenses 105, a revolver motor 107 used for revolving the mounter 106 in order to insert the object lens 105 electromechanically into the optical axis, and a revolver sensor cluster 108.

The revolver sensor cluster 108 comprises (not shown in Figure.) an initialization sensor required for initializing the revolver 104 and a movement completion sensor used for detecting an insertion of the object lens 105 into the optical axis.

The X-Y stage 103 is used for mounting the specimen 102, is enabled to move in the X-Y directions, and is mounted on a Z stage 109 that is capable of moving in the Z direction.

The Z stage 109, which is driven by the Z stage motor 110, having received an instruction for driving from the observer, functions as a focusing means for changing the relative distance between the specimen 102 and object lens 105 so as to move the specimen 102 to the focus position of the object lens 105. Further, the Z stage 109 is equipped with a Z stage sensor 120 for detecting the original position.

The microscope frame 100 is further equipped with a lamp house 112 that comprises a light source 111 for illuminating the specimen 102 so that the light emitted from the light source 111 is led through a condenser lens 113 to a half mirror 114. The light reflected by the half mirror 114 at a 90-degree angle is led through the object lens 105 to be irradiated on the specimen 102. The light reflected by the specimen 102 is led through the half mirror 114, and causes an eye piece lens 117 and a charge-coupled device (CCD) camera 118 to form the image of the specimen 102 by means of the imaging lens 116 housed in a lens tube 115.

The observer is enabled to observe an enlarged image of the specimen 102 through the eye piece lens 117, or instead has an image obtained by the CCD camera 118 displayed on the application software running on the PC 119 (i.e., has the display of the PC 119 display the image by means of the GUI run by the aforementioned application software).

The observation apparatus 1 further comprises a control unit 2 used for controlling various electric parts such as the above described stage. Power supply lines for supplying the above described electric parts with power through the control unit 2 and signal lines for the control unit 2 transmitting control signals and inputting the data from the above described various sensors, exist between the control unit 2 and various constituent components equipped in the microscope frame 100. The control unit 2 is also connected to the PC 119. The PC 119 is enabled to instruct (e.g., an instruction for a driving, or "drive instruction" hereinafter) the observation apparatus 1 to carry out a desired operation by way of the control unit 2.

The application software for enabling the observer to carry out operations such as the above described observation and the drive instruction is installed in the PC 119.

FIG. 2 is a diagram showing the electrical configuration of the observation apparatus 1 according to embodiment 1, specifically showing the configuration of the control unit 2.

The control unit 2 comprises: a central processing unit (CPU) 201; random access memory (RAM) 202 storing various kinds of data such as arithmetic operation data; read-only memory (ROM) 203 storing a control program and data and the like; various interface (I/Fs) units 204; and a bus 205 interconnecting the CPU 201, RAM 202, ROM 203 and various I/F units 204. The control unit 2 further comprises a serial I/F 206, an AC/DC converter 207 and a switch unit 211.

Note that the configuration shown in FIG. 2 is an arbitrary example, and an alternative configuration may comprise the AC/DC converter 207 and switch unit 211 outside of the control unit 2. Meanwhile, only the CPU 201 and various I/F 204 may be regarded as "control units", and the electrically driven units, such as a motor, are controlled by a "control unit".

In the example shown in FIG. 2, the various I/F 204 are a revolver I/F 204(a), a Z stage I/F 204(b), and a light source I/F 204(c). The revolver I/F 204(a) is a constituent component for recognizing a state(s) by receiving signals from the revolver sensor cluster 108 and driving the revolver motor 107. The Z stage I/F 204(b) is a constituent component for recognizing a state(s) by receiving a signal from the Z stage sensor 120 and driving the Z stage motor 110. Further, the light source I/F 204(c) is a constituent component for turning on, turning off, and adjusting the intensity of the light source 111.

The revolver I/F 204(a) and Z stage I/F 204(b) each comprise constituent components, including a driver for driving a motor a specified amount upon receiving a drive instruction from the CPU 201, a current position counter for maintaining the current position of a motor, and a sensor register for maintaining the state of a sensor. The aforementioned driver, counter and register are not shown in a drawing herein.

The revolver I/F 204(a) and Z stage I/F 204(b) are connected to the CPU 201 by way of the bus 205, and thereby the CPU 201 is enabled to read the state of the sensor and read/write the content of the current position counter.

An instruction command from the application software running on the PC 119 is transmitted to the CPU 201 by way of the serial I/F 206 so that the CPU 201 executes the processing in accordance with the command, and then returns information, such as a normal complete or error information, to the PC 119 by way of the serial I/F 206.

An AC cable 208 is connected to a commercial or industrial power source so that the AC power supplied from the power source is input into the AC/DC converter 207 comprised in the control unit 2.

The AC/DC converter 207 converts an AC current into a DC current, supplies the CPU 201, ROM 203, RAM 202 and various I/F units 204 with a logic-use power source 209, and supplies the respective motors 107 and 110 and light source 111 with motor/lamp-use power sources 210. Note that power supply lines are equipped for supplying these various power sources 209 and 210 (the signs 209 and 210 shown in FIG. 2 may be respectively regarded as the power supply line for supplying the logic-use power source 209 and for supplying the motor/lamp-use power sources 210). The AC/DC converters 808 and 1201, both of which are described later, and the AC/DC converter 207 correspond to the power supply unit of the observation apparatus 1.

The switch unit 211, constituted by relay, photo coupler and other relevant components, is equipped in the power supply line of the motor/lamp-use power sources 210. The ON/OFF line of the switch unit 211 is connected to the input/output (I/O) port 212 of the CPU 201.

Here, when turning the I/O port 212 of the CPU 201 to H, a relay in the switch unit 211 is released (i.e., opened) and therefore the motor/lamp-use power sources 210 are not supplied to the motors 107 or 110, or to the light source 111. That is, the CPU 201 controlling the switch unit 211 under an Off state cuts the motor/lamp-use power sources 210 off to the individual motors 107 and 110 and light source 111. In contrast, when turning the I/O port 212 of the CPU 201 to L, the switch unit 211 is connected so that the motor/lamp-use power source 210 is supplied to the individual motors 107 and 110 and light source 111. That is, the CPU 201 controlling the switch unit 211 under an On state supplies the electrically driven unit and light source with the power.

Incidentally, although a light source is not an electrically driven unit, the definition "electrically driven unit(s)" includes the light source since the same power supplied to the electrically driven unit is also supplied to the light source. In other words, not only the Light source but also the constituent components supplied with the motor/lamp-use power sources 210 are regarded as included in "electrically driven unit".

Further, the I/O port 212 of the CPU 201 is connected to an indicator 213 that is constituted by a light emitting diode (LED), and the indicator 213 is turned off when the I/O port 212 of the CPU 201 is turned to H, while the indicator 213 is turned on when the I/O port 212 of the CPU 201 is turned to L.

FIG. 3 is a diagram showing an example of a GUI displayed on the display of the PC 119 by the application software installed in the PC 119.

The GUI 3 exemplified in FIG. 3 comprises an image display unit 301 for displaying a microscope image obtained by a CCD camera, a revolver drive instruction button 302 for setting an object lens 105 at a designated magnification ratio, a focus adjustment unit 303 for driving the Z stage 109, and a terminate button 304 for terminating the application software.

When the revolver drive instruction button 302 is pressed by a user operation, a drive instruction for the revolver 104 is transmitted from the PC 119 to the control unit 2 (i.e., the CPU 201) by way of the serial I/F 206. When the focus adjustment unit 303 is operated, a drive instruction for the Z stage 109 is transmitted from the PC 119 to the control unit 2 (i.e., the CPU 201) by way of the serial I/F 206.

Having received the aforementioned instruction, the CPU 201 comprised by the control unit 2 issues a drive instruction to each I/F unit 204, and, upon completion of the drive, the CPU 201 sends a completion response command back to the PC 119 by way of the serial I/F 206.

Next is a description of the operation of the observation apparatus 1 according to the present embodiment 1. The apparatus is configured as described above.

Before using the observation apparatus 1, the observer plugs the AC cable 208 into the service outlet to turn on the power. Then she/he turns on the power to the PC 119 to initiate the application software and starts an observation of the specimen 102.

[1] Flow of Initializing the Observation Apparatus

Figure 4:
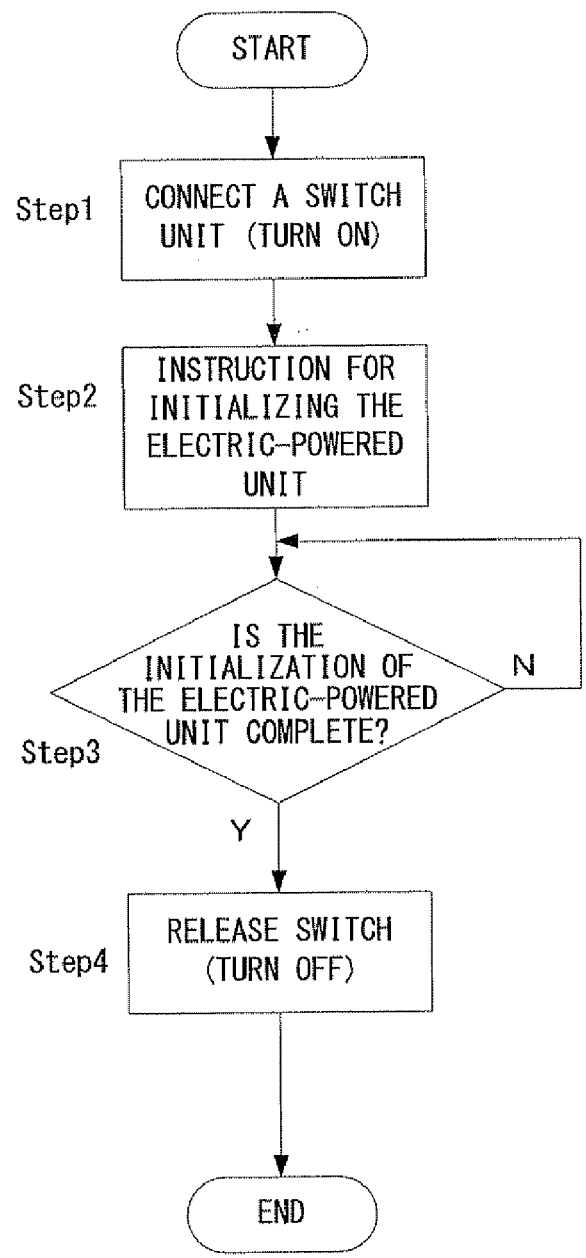

The following is a description of the operation of the CPU 201 upon turning on the power to the observation apparatus 1, with reference to the flow chart shown in FIG. 4.

Note that "Y" is "yes", "N" is "no" in the flow chart shown in FIG. 4. The definition is the same for other flow charts herein.

Further, the process shown in FIG. 4 is attained by the CPU 201 reading, and executing, a prescribed application program stored in the ROM 203.

When the power to the observation apparatus 1 is turned on, the CPU 201 first turns the I/O port 212 to L in order to connect (i.e., turn on) the switch unit 211 (step 1). In this event, the indicator 213 is turned on.

When the switch unit 211 is turned on, the power is supplied to the individual motors 107 and 110 and light source 111, and the CPU 201 accordingly gives each I/F unit 204 an instruction to initialize the electrically driven units (step 2).

Upon issuing the instruction for initialization, the CPU 201 checks each I/F unit 204, waits for the initialization to be completed and, when the initialization is completed (i.e., "Y" for step 3), turns the I/O port 212 to H for releasing (i.e., turning off) the switch unit 211 (step 4), and completes the present flow. In this event, the indicator 213 is turned off. Incidentally, with this initialization process, the current position counter of each I/F unit 204 maintains the respective current positions of the electrically driven units (such as motors) while the sensor register maintains the respective states of sensors.

When the above described processes are completed, the CPU 201, each I/F unit 204, and the like having small amounts of power consumption are supplied with power, whereas the individual motors 107 and 110 and light source 111 having a large amount of power consumption are not supplied with power. Such a state is defined as a "power save mode" in the following description. With the above described flow, the observation apparatus 1 completes the initialization and waits for the application software to be initiated in the power save mode.

As described above, the CPU 201 and each I/F unit 204 are supplied with power in the power save mode, and therefore it is possible to recognize (detect) the position information of the electrically driven units (such as motors) after the initialization. Incidentally, if the sensor is a sensor such as a photo sensor requiring a supply of power, the sensor is supplied with the power through the I/F unit 204 as a result of supplying the power thereto.

[2] Flow of Initializing Application Software

Figure 5:
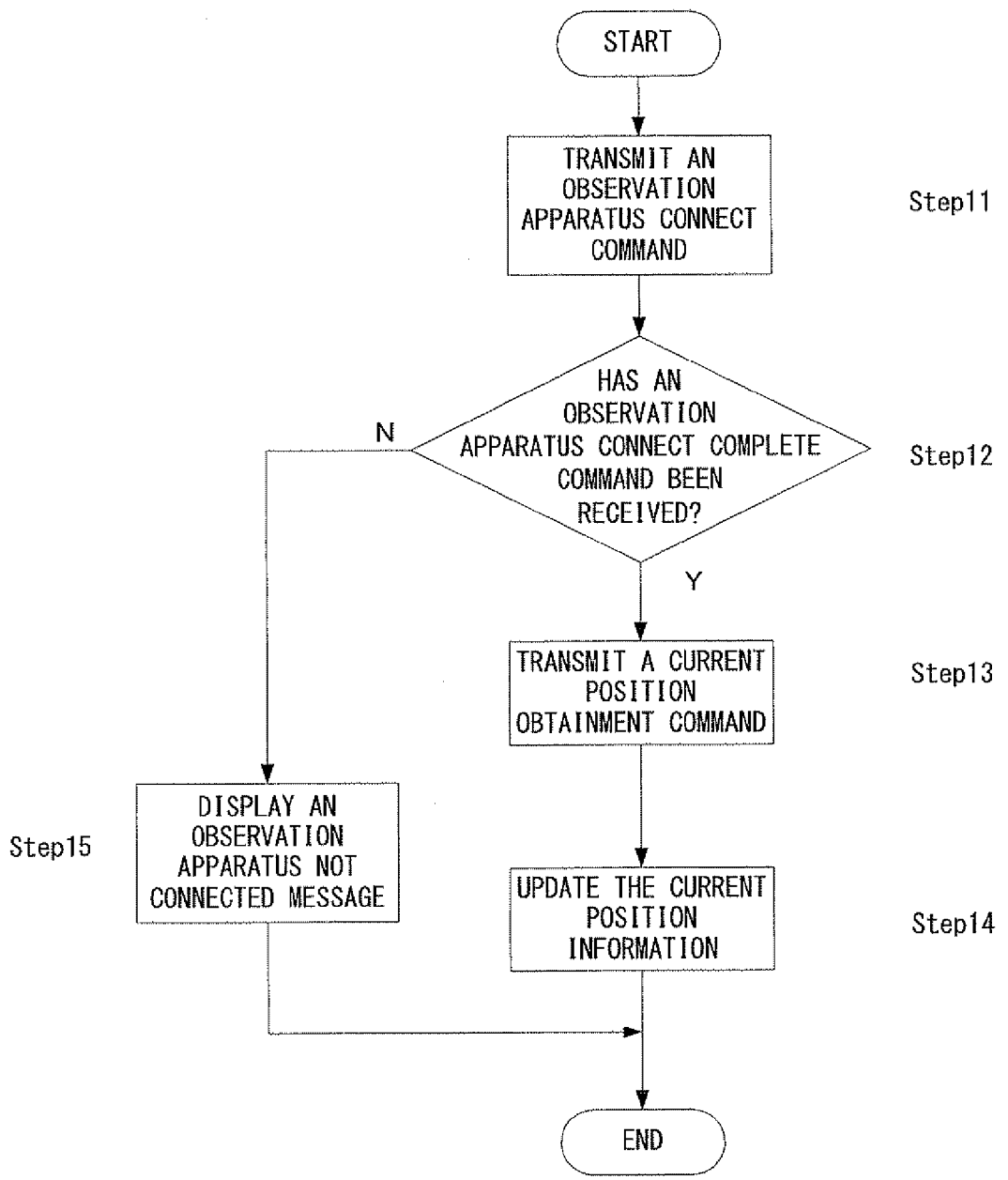
FIG. 5 is a flow chart showing an operation when application software is initiated.

Next is a description of the operation of the application software when the power to the PC 119 is turned on and the application software is initiated, with reference to the flow chart shown in FIG. 5.

While not specifically shown herein, the PC 119 is a commonly configured general-purpose computer, such as a personal computer (PC), which comprises, for example, a central processing unit (CPU); a storage apparatus including memory, a hard disk and the like; a display; an operation unit including keyboard, mouse and the like; a communication functional unit; and other relevant units, wherein the above described application software is stored in the storage apparatus so that the CPU reads and executes the application software, and thereby the operation in accordance with the flow chart shown in FIG. 5 is attained. Such a scheme is similar to the operations in accordance with the flow charts shown in later described FIGS. 6 and 7.

Further, the above described GUI 3 is displayed on the above described display so that the observer inputs and gives a command, or the like, by operating the above described operation unit.

Figure 6:
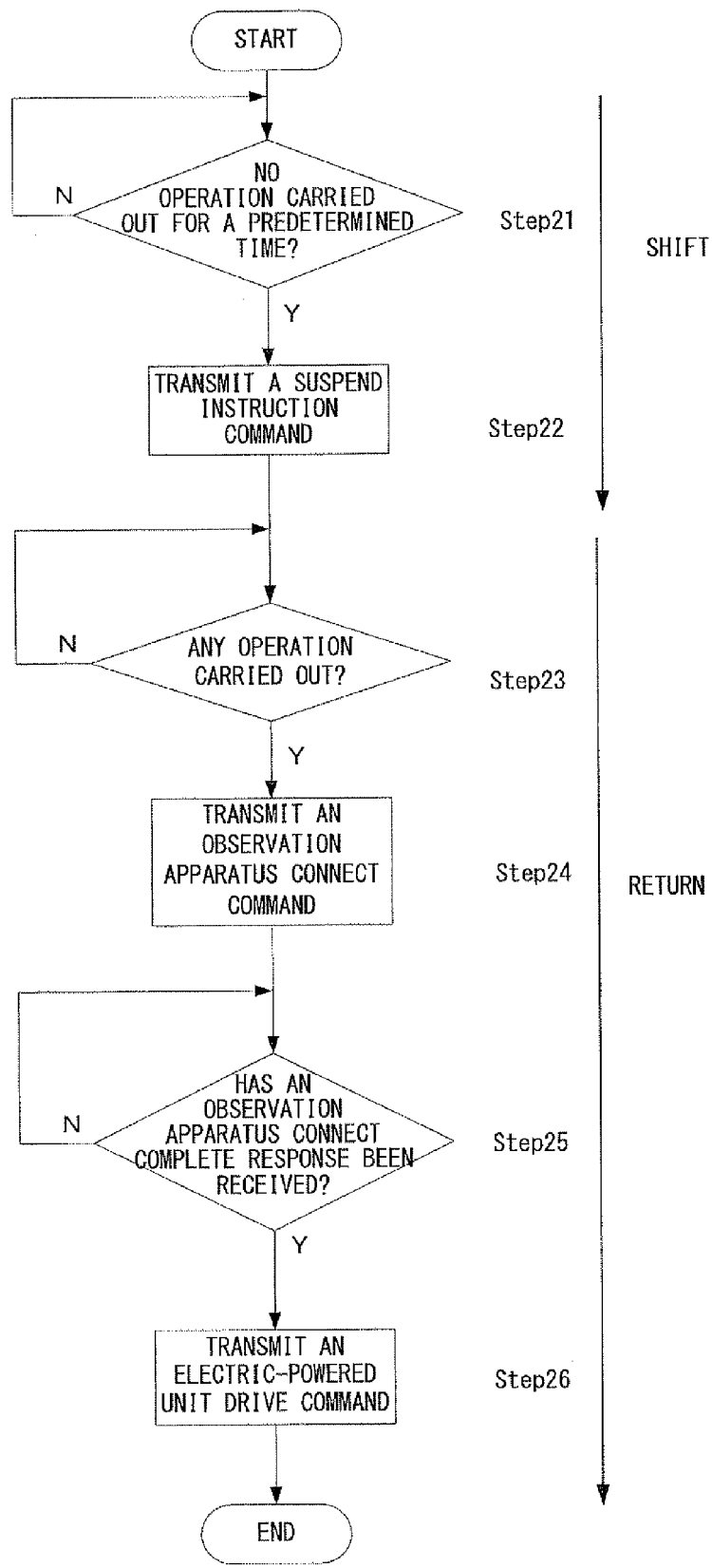
FIG. 6 is a flow chart showing application software suspending an operation.

Note that, in the present example, the processing executed by the CPU 201 in accordance with processes of the flow charts shown in FIG. 5 and the later described FIGS. 6 and 7 are described without specifically being depicted in a flow chart or the like.

When the application software is initiated, an observation apparatus connection command is transmitted to the control unit 2 (step 11). When the CPU 201 of the control unit 2 receives the aforementioned command, the I/O port 212 is turned to L in order to connect (i.e., turn ON) the switch unit 211 (and the indicator 213 is turned on in association with the operation) and a connection complete response is returned back to the PC 119.

When the application software recognizes that the PC 119 has received the connection complete response (i.e., "Y" for step 12), a command for obtaining the current position of each electrically driven unit is transmitted to the control unit 2 (step 13).

Having received the aforementioned command, the CPU 201 of the control unit 2 obtains the current position of the electrically driven unit from each I/F unit 204 and sends the obtained current position back to the PC 119.

When the application software recognizes that the PC 110 has received the current position, the current position state of the GUI 3 is updated (step 14) and the present flow ends. With this operation, observation is enabled.

In contrast, if the PC 119 does not receive a connection complete response (i.e., "N" for step 12), an "observation apparatus unconnected" message is displayed on the GUI 3 (step 15) and the present flow is terminated.

With the above described flow, observation is enabled without the observation apparatus 1 needing to be initialized when the application software is started. The effect of this becomes particularly remarkable when the observation apparatus 1 is returned from a suspend state (i.e., a pause state, which is described later), or the application is restarted after it is terminated (which is described later), after the observation apparatus 1 is initially started.

That is, the observation apparatus 1 of the present example is basically configured to be used without turning off the power after an initial startup. The configuration is also such that the observation apparatus 1 is in a standby state in the above described power same mode, in which little power is consumed, when the application is in a suspend state (which is described later) or is terminated, and therefore it is not necessary to initialize the observation apparatus 1 when the application is restarted. Thereby observation is immediately enabled when the application software is started.

Meanwhile, the above described step 12 is "N" essentially when the application is started with the observer forgetting to turn on the power to the observation apparatus 1. Such a case requires a restart of the application software after the power is turned on to the observation apparatus 1, as described for the conventional technique, thus requiring the observer to carry out cumbersome work. The present method, however, allows such a situation to occur only when the observation apparatus 1 is initially started for the first time, and therefore there is no possibility of step 12 being "N" afterwards, solving one of the conventional problems.

Further, no matter what kind of state the application software is in, the CPU 201 is always enabled to communicate with the PC 119 even in the above described power save mode, unless the power to the PC 119 is turned off. It is of course possible to configure in such a manner that the CPU 201 communicates with the PC 119 periodically or every time a certain event occurs, instead of communicating constantly. For example, if there is a certain change occurring in the observation apparatus 1 during the power save mode, such a change can be detected because the CPU 201 and others are in an operable state and therefore the detection result and the like can be reported to the PC 119 as described above.

[3] Flow Applied to a Shift to a Suspend State (i.e., a Pause State), and a Return from the Suspend State.

If no operation is carried out for a predetermined period of time in an observation-enabled state, the application software shifts to a suspend state. The following is a description of the operation of the shift to the suspend state and return therefrom of the application software with reference to the flow chart shown in FIG. 6.

If no operation is carried out on the GUI 3 for a predetermined period of time ("Y" for step 21), the application software transmits a suspend instruction command to the control unit 2 (step 22). Having received the aforementioned command, the CPU 201 comprised in the control unit 2 turns the I/O port 212 to H in order to open (i.e., turn OFF) the switch unit 211. In this event, the indicator 213 is turned off. Then the CPU 201 transmits a connection complete response to the PC 119. Having received the response, the application software shifts to a suspend state.

If no operation is carried out on the GUI 3 thereafter ("N" for step 23), the switch unit 211 is left open, and the motors 107 and 110 and light source 111 within the observation apparatus 1, which consume a large amount of the power, are left unsupplied with the power.

If any operation is carried out on the GUI 3 ("Y" for step 23), the application software returns from the suspend state and transmits an observation apparatus connect command to the control unit 2 (step 24). Having received the aforementioned command, the CPU 201 comprised in the control unit 2 turns the I/O port 212 to L in order to connect the switch unit 211. In this event, the indicator 213 is turned on. Then the CPU 201 transmits a connection complete response back to the PC 119.

Recognizing that the PC 119 has received the aforementioned command ("Y" for step 25), the application software transmits a drive command corresponding to the operated button on the GUI 3 to the control unit 2 (step 26), and exits the present flow.

With this flow, the observation apparatus 1 shifts to the state (i.e., the above described power save mode) in which the motors 107 and 110 and light source 111—which consume a large amount of power—are not supplied with the power, while the CPU 201 and the like—which consume a small amount of power—are supplied with power in the suspend state of the application software. Therefore, it is possible to realize the power save for the observation apparatus 1 in the suspend state. Further, the CPU 201, I/F unit 204 and the like are supplied with power during the power save mode, and therefore it is possible to recognize the current position of the electric parts when returning from the suspend state, and thus an initializing operation is not required.

Additionally, the application software maintains the obtained current position information in the suspend state, and therefore steps 13 or 14 are not required in the process at the return from the suspend state. Instead only the command transmission in step 24 is required.

It is, however, conceivable that the observer or another person has manually operated the electrically driven unit during a suspend state. Even in such a case the control unit 2 is enabled to detect the current position of the electric parts since the CPU 201, I/F unit 204, and the like are supplied with power. However, it is necessary to update the current position information maintained by the application software, and accordingly considering this aspect, an alternative configuration may be such that the processes of steps 13 and 14 are carried out again in the process of the above described return. Further, an alternative configuration may also be such that the CPU 201 reports the current position information of the electric parts together with the above described connection complete response.

Yet, it may be configured to eliminate a need to carry out the process of steps 13 and 14 once again by performing, for example, the process described in the following, even if the above described aspect has to be considered, because the CPU 201 and PC 119 are enabled to communicate with each other even in the suspend state.

That is, an exemplary configuration is such that the CPU 201 obtains the latest current position information periodically from each I/F unit 204, compares the obtained information with the current position information that is maintained by the CPU 201 itself, and transmits the aforementioned latest current position information to the PC 119 if the comparison result indicates a difference (that is, a change in the positions of the electric parts is detected, during a power save mode). The PC 119 maintains the latest current position information so that the application software obtains it from the PC 119 when the process of the above described return is carried out.

[4] Flow Applied when the Application Software is Terminated

When ending the observation, the observer presses the terminate button 304 on the GUI 3 to terminate the application software. The following is a description of the operation of the application software when the terminate button 304 is pressed, with reference to the flow chart shown in FIG. 7.

When the terminate button 304 is pressed, the application software transmits a suspend instruction command to the control unit 2 (step 31).

Having received the aforementioned command, the CPU 201 comprised in the control unit 2 turns the I/O port 212 to H in order to open the switch unit 211. In this event, the indicator 213 is turned off. Then the CPU 201 transmits a connection complete command to the PC 119.

Recognizing that the PC 119 has received the aforementioned response ("Y" for step 32), the application software terminates itself (step 33) and exits the present flow.

With this flow, if the application software is not operated, the observation apparatus shifts to the state (i.e., the above described power save mode) in which the motors 107 and 110 and light source 111—which consume a large amount of power—are not supplied with power, while the CPU 201 and the like—which consume a small amount of power—are supplied with power. Therefore, the observer is required to start only the application software when an observation is restarted and she/he is enabled to carry out the observation at once without needing to perform an initializing operation for the electric parts, as described above.

The observation system according to the above described embodiment 1 shortens the time between the startup of the application software and a usage start, and makes it possible to reduce extraneous power consumption. Further, the power save is also enabled during the suspend state.

Additionally, the CPU 201 and each I/F unit 204 are supplied with power also during the suspend state, and therefore the reinitializing operation for the electric parts is no longer required when returning from the suspend state. A current position obtain command need not be transmitted.

Next is a description of a preferred embodiment 2 of the present invention. Descriptions of the same parts as in embodiment 1 are not provided here.

Figure 8:
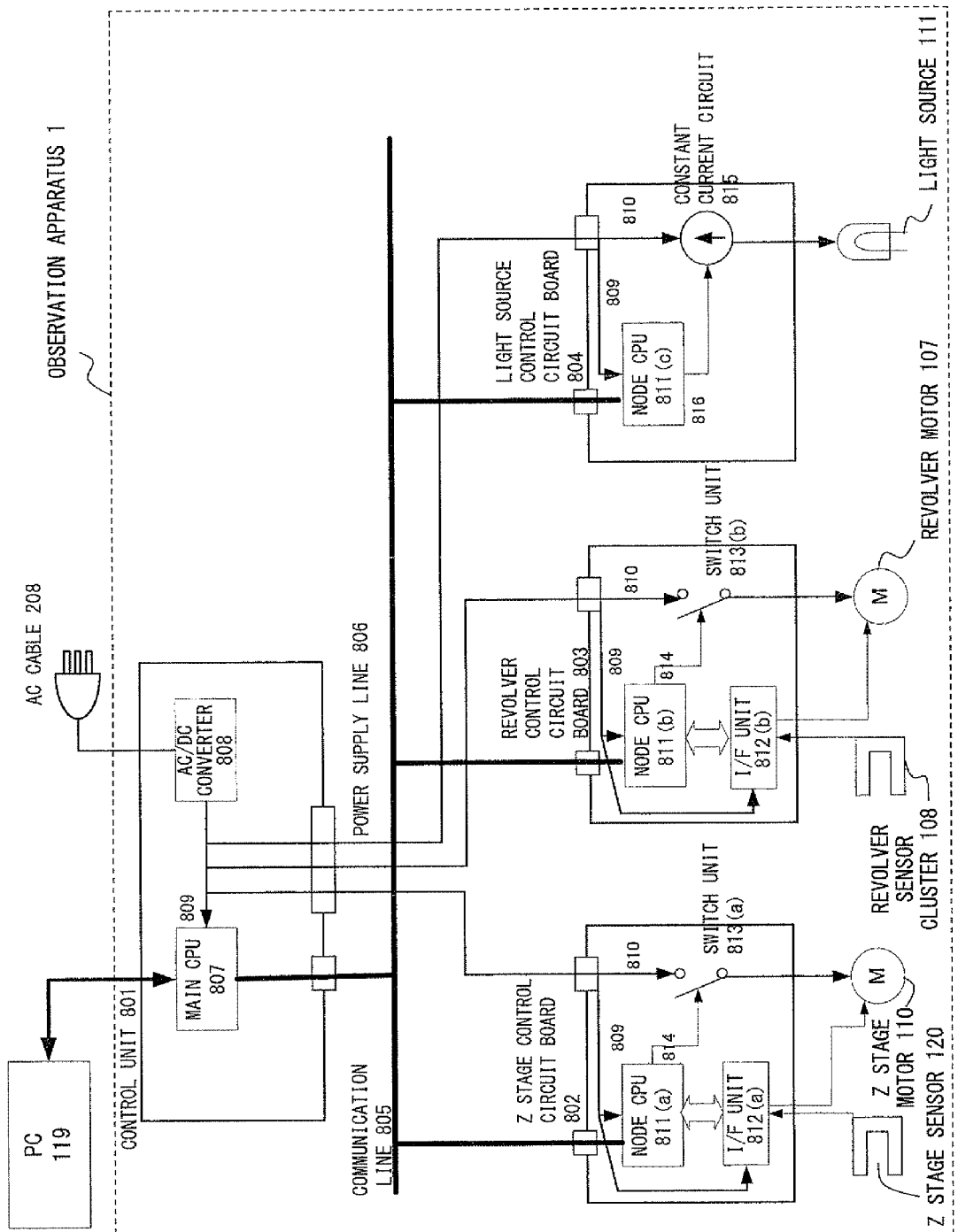
FIG. 8 is a diagram showing the electrical configuration of a preferred embodiment 2.

FIG. 8 is a diagram showing the electrical configuration of an observation apparatus 1 according to embodiment 2.

The observation apparatus 1 according to embodiment 2 comprises individual constituent components, i.e., a control unit 801, a Z stage control circuit board 802, a revolver circuit board 803, and a light source control circuit board 804 (the entirety may be regarded as the control unit 2 shown in FIG. 1, or only the control unit 801 may be regarded as the control unit 2). These constituent components are interconnected by way of a communication line 805 constituted by a serial bus, such as a controller area network (CAN) and Ethernet (Registered Trademark) so that the communication between the individual constituent components is carried out through the communication line 805. Further, the power is supplied from an AC/DC converter 808 to a main CPU 807 and individual control circuit boards 802, 803 and 804 by way of power supply lines 806.

The control unit 801, comprising the main CPU 807 and AC/DC converter 808, in which the AC/DC converter 808 converts AC power, which is a commercial power source, into a DC current, generates a logic-use power source 809, which is to be supplied to the main CPU 807, individual node CPU 811, and each I/F unit 812, and a motor/lamp-use power source 810 to be supplied to the electrically driven unit including a motor and the like, and to the light source 111, and supplies each constituent component with the aforementioned power sources (i.e. power) by way of the power supply lines 806. That is, the power supply lines 806 provide two lines, i.e., the logic-use power source 809 and motor/lamp-use power source 810, and, through the respective lines, the main CPU 807, individual node CPU 811, and each I/F unit 812 are supplied with the logic-use power source 809, while the Z stage motor 110, revolver motor 107, and light source 111 are supplied with the motor/lamp-use power source 810.

The main CPU 807 has built-in ROM and RAM (which are not shown in a drawing) and is connected to the PC 119 (the connection may be through a serial I/F as in the configuration shown in FIG. 2) so as to interpret a command from the PC 119 and transmit a control instruction for controlling the electrically driven unit and light source onto the communication line 805. Note that the number of light sources may not necessarily be one.

In the following description, the form of communication between the PC 119 and main CPU 807 is assumed to be through a command, while communication between the main CPU 807 and individual node CPU 811 is assumed to be through a message.

The above described individual control circuit boards 802, 803 and 804 comprise node CPUs 811 (i.e., 811(*a*), 811(*b*) and 811(*c*), respectively) so that the individual node CPUs 811 communicate with the main CPU 807 by way of the communication line 805.

As shown in FIG. 8, the communication lines 805 interconnecting the main CPU 807 and node CPUs 811 are connected in a bus-like form so that all CPUs are able to receive a message on the bus, and therefore an individual message is vested with an identification (ID) number with which each message is enabled to identify which CPU is enabled to receive it or whether all CPUs are.

The present embodiment is configured such that a switch open message, a switch connect message and an electrically driven unit initialization message can be received by all nodes.

Individual control units are equipped correspondingly to the respective electrically driven units and light source(s). The control units are those shown in FIG. 8, that is, the Z stage control circuit board 802, revolver circuit board 803, light source control circuit board 804 and the like.

Both the Z stage control circuit board 802 and revolver circuit board 803 comprise node CPUs 811 (i.e., 811(*a*), 811(*b*)), I/F units 812 (i.e., 812(*a*) and 812(*b*)), and switch units 813 (i.e., 813(*a*) and 813(*b*)).

The node CPU 811 has built-in ROM and RAM (which are not shown in a drawing here), and interprets a message existing on the communication line 805 to issues a motor drive instruction to the I/F unit 812, or to obtain the information from a sensor.

The I/F unit 812 comprises a driver used for driving a motor for a specified amount if a drive instruction is received from the node CPU 811, a current position counter used for maintaining the current position of a motor, and a sensor register used for maintaining the state of the sensor.

In the Z stage control circuit board 802 and revolver circuit board 803, the switch units 813 (i.e., 813(*a*) and 813(*b*)) each constituted by a relay, photo coupler and other relevant components are equipped on the power supply line for supplying the above described motor/lamp-use power source 810 so that each node CPU 811 carries out an ON/OFF control for each respective switch unit 813, thereby turning ON/OFF the power supply to the respective motors (110 and 107). The ON/OFF line of the switch unit 813 is connected to the I/O port 814 of the node CPU 811.

Here, turning the I/O port 814 of the node CPU 811 to H opens (i.e., turns off) the switch unit 813, thereby cutting off the motor/lamp-use power source 810 to the motor. In contrast, turning the I/O port 814 of the node CPU 811 to L closes (i.e., turns on) the switch unit 813, thereby supplying the motor with power.

The light source control circuit board 804 comprises a node CPU 811 (i.e., 811(*c*)), and a constant current circuit 815 which is connected to the power supply line for supplying the above described motor/lamp-use power source 810, and which generates a drive current for driving the light source 111. Further, the constant current circuit 815 comprises a (electric) current control unit (which is not shown in a drawing here) which is used for increasing or decreasing the drive current in accordance with an analog voltage value. The present method is, however, devised to perform an ON/OFF control for the output by means of the constant current circuit 815, and therefore the constant current circuit 815 may also be regarded as a switch unit 813.

The node CPU 811 comprises a digital to analog (DA) converter 816 the output of which is connected to the above described current control unit.

The node CPU 811 receives a message from the main CPU 807, changes the values of the output voltage of the DA converter 816, and changes the values of the drive current, thereby turning on or off the light source 111, or changing the intensity thereof.

Next is a description of the operation of the present embodiment configured as described above.

Note that the operation of the application software is the same as in embodiment 1, and therefore only the difference from embodiment 1 is described here.

Before using the observation apparatus 1, the observer connects the observation apparatus 1 to a power outlet, turns on the power of the PC 119 to initiate the application software, and starts the observation of a specimen 102. Similar to embodiment 1, an initiating operation is required when the observation apparatus 1 according to embodiment 2 is connected to the power outlet, and thereafter, however, even when the application software is terminated (and further, if the power is turned off the PC 119), there is no need to carry out an initializing operation for the observation apparatus 1 when the application software is restarted, provided that the observation apparatus 1 is not disconnected from the power outlet, and therefore it is in the above described power save mode, and thereby an immediate startup of observation is enabled. Further, there is no possibility of the power being turned off for the observation apparatus 1 when the application software is restarted, and therefore the conventional problem can be solved also in this aspect.

[5] Flow after Turning on the Power to the Observation Apparatus

The following is a description of the operation of the main CPU 807 when the observation apparatus 1 is connected to the power outlet with reference to the flow chart shown in FIG. 9.

When the power is turned on to the observation apparatus 1, the main CPU 807 transmits the above described switch connect message onto the communication line 805 in order to connect (i.e., turn on) the switch units 813, etc. of the Z stage control circuit board 802, revolver circuit board 803, and light source control circuit board 804 (step 41).

The respective node CPUs 811 of the Z stage control circuit board 802 and revolver circuit board 803, having received the aforementioned message, connect (i.e., turn ON) the switch units 813 and transmit the connection complete messages to the main CPU 807, respectively. Meanwhile, the node CPU 811 of the light source control circuit board 804 starts the output of the DA converter 816 and transmits a switch connection complete message to the main CPU 807. The above described processes supplies the Z stage motor 110 and revolver motor 107 with the power and turns on the light source 111.

Having received the above described switch connection complete messages from all node CPUs 811 ("Y" for step 42), the main CPU 807 transmits the above described electrically driven unit initialize message on to the communication line 805 (step 43).

Having received the aforementioned message, the individual node CPU 811 starts the initializing operation and, upon completing it, transmits an electrically driven unit initialization complete message to the main CPU 807.

Having received the electrically driven unit initialization complete messages from all node CPUs 811, ("Y" for step 44), the main CPU 807 transmits the above described switch open message onto the communication line 805 (step 45).

Having received the aforementioned message, the node CPUs 811 of the Z stage control circuit board 802 and revolver circuit board 803 open (i.e., turn off) the respective switch units 813 and transmit respective switch open complete messages to the main CPU 807. Meanwhile, the node CPU 811 of the light source control circuit board 804 stops the output of the DA converter 816 and transmits a switch open complete message to the main CPU 807. With these processes, neither the Z stage motor 110 nor revolver motor 107 is supplied with the power; also, the light source 111 is turned off.

When the aforementioned switch open complete messages are all received ("Y" for step 46), the present flow is ended.

With the above flow, the observation apparatus 1 completes the initialization and stands by for the application software to be started in the state (i.e., the power save mode) in which the motor and light source, which consume large amounts of power, are not supplied with power while the components which consume small amounts of power, such as the main CPU 807, individual node CPUs 811, individual I/F units 812 and the like, are supplied with power, at the initialization complete position.

Even in the power save mode, the main CPU 807, individual node CPUs 811, and individual I/F units 812 are supplied with power, and thereby it is possible to recognize (detect) the current position of the electrically driven units.

Note that the processes of the main CPU 807 and individual node CPUs 811 described with reference to the above described FIG. 9 are enabled by the main CPU 807 and individual node CPUs 811 executing a prescribed application program pre-stored in the above described built-in ROM in the main CPU 807 and individual node CPUs 811, respectively. Such a practice is the same for the processes shown in FIGS. 10 and 11.

[6] Flow Applied when an Observation Apparatus Connect Command is Received

When the observer turns on the power to the PC 119 and starts the application software, executing the process shown in the above described FIG. 5, thereby transmitting the above described observation apparatus connect command to the main CPU 807. Alternately, when returning from a suspend state, the above described observation apparatus connect command is transmitted to the main CPU 807 with the execution of the above described step 24.

Next is a description of the process carried out when the main CPU 807 receives the above described observation apparatus connect command, with reference to the flow chart shown in FIG. 10.

Having received an observation apparatus connect command, the main CPU 807 transmits the above described switch connect message to the individual node CPUs 811 (step 51).

The respective node CPUs 811 of the Z stage control circuit board 802 and revolver circuit board 803, having received the aforementioned message, connect (i.e., turn on) the switch unit 813 and respectively transmit switch connection complete messages to the main CPU 807. Meanwhile, the node CPU 811 of the light source control circuit board 804 starts the output of the DA converter 816 and transmits a switch connection complete message to the main CPU 807. With these processes, the Z stage motor 110 and revolver motor 107 are supplied with power, and the light source 111 is turned on.

Having received the respective switch connection complete messages from all node CPUs 811 ("Y" for step 52), the main CPU 807 transmits a connection complete command to the PC 119 (step 53) and exits the present flow.

Alternatively, in step 53, the current position information of the individual electric parts may also be transmitted. Alternatively, it may be configured to transmit the current position information of the individual electric parts to the PC 119 when the current position obtain command (in step 13) is received.

Note that current position information of the individual electric parts is obtained, for example, by the respective node CPUs 811 from the respective I/F units 812 at the completion of the above described initialization, and is transmitted to the main CPU 807 by being included in the above described electrically driven unit initialization complete message, and the main CPU 807 maintains these pieces of the respective current position information. An alternative configuration may be such that the main CPU 807, having received the above described current position obtain command, transmits a prescribed command to the individual node CPUs 811, thereby causing then to send back the respective current position information.

With the process of the above described flow, the Z stage motor 110 and revolver motor 107 are supplied with power, and the light source 111 is turned on when the application software is started.

Further, an observation is enabled without needing to perform an initializing operation for the electrically driven units.

[7] Flow Applied when a Suspend Instruction Command is Received

In an observation enabled state, if no operation is carried out for a certain period of time, or when the application software terminate, the application software transmits a suspend instruction command to the main CPU 807 in the process shown in FIG. 6 or 7.

Figure 11:
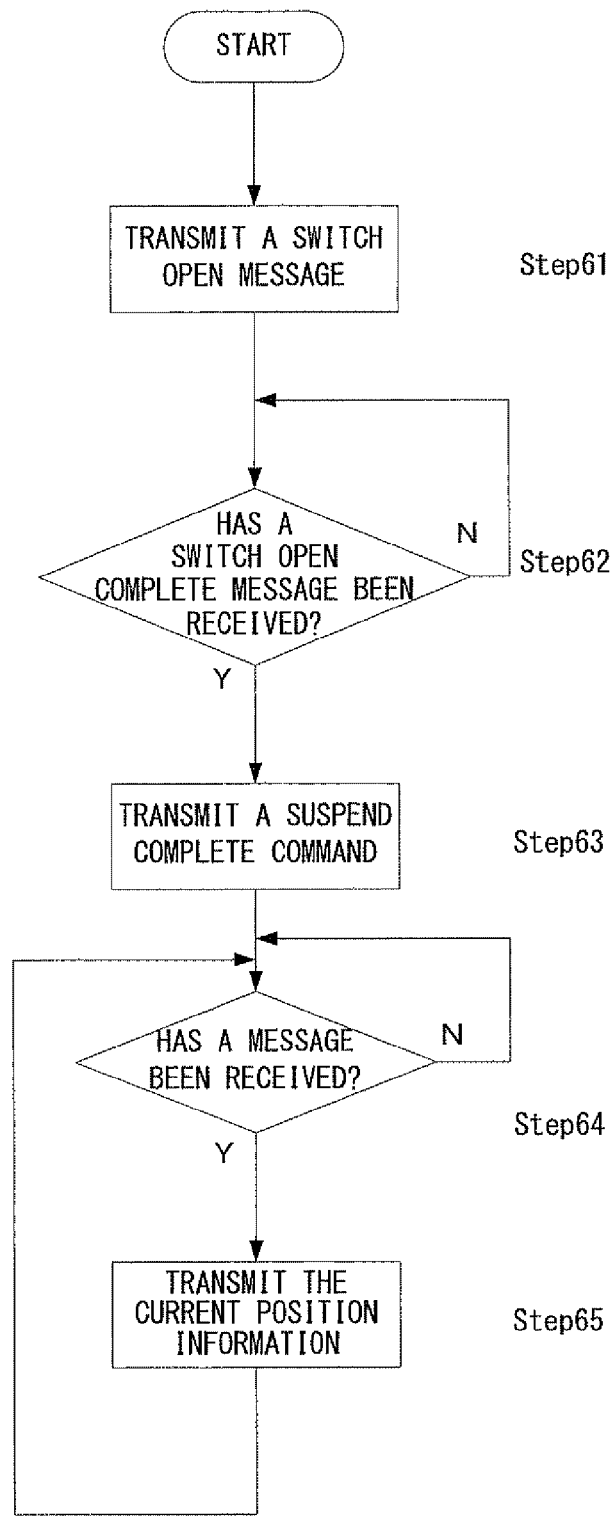
FIG. 11 is a flow chart showing the operation of a main CPU when a suspend instruction command according to embodiment 2 is received.

The following is a description of the process performed when the main CPU 807 receives the aforementioned command, with reference to the flow chart shown in FIG. 11.

Having received the above described suspend instruction command, the main CPU 807 transmits the above described switch open message to all node CPUs 811 (step 61). Having received the aforementioned message, the respective node CPUs 811 of the Z stage control circuit board 802 and revolver circuit board 803 opens (i.e., turns OFF) the switch unit 813 and transmits a switch open complete message to the main CPU 807. Meanwhile, the node CPU 811 of the light source control circuit board 804 stops the output of the DA converter 816 and transmits a switch connection complete message to the main CPU 807. With these processes, neither the Z stage motor 110 nor the revolver motor 107 is supplied with power; also, the light source 111 is turned off.

Having received a switch open complete messages from all node CPUs 811 ("Y" for step 62), the main CPU 807 transmits a suspend complete command to the PC 119 (step 63).

Then, the application is in a suspend state, or the application software is terminated, the individual node CPUs 811 periodically check respective sensor state information (e.g., position information and the like) maintained by the I/F units 812, and therefore, if the positions of an electric part are actually changed for any reason, such as if the observer has manually changed any electric part, the change can be detected by the change in the sensor state information. For example, if the observer has manually changed the revolver, a change in the value of the revolver position sensor (i.e., the sensor state information of the revolver sensor cluster 108) is recognized.

Describing it using this example, if there is a change in the value of the revolver position sensor, the node CPU 811 transmits current position information (i.e., the (latest) position information after the change) as a message to the main CPU 807. The same operation is of course carried out for other electric parts.

Having received the aforementioned message ("Y" for step 64), the main CPU 807 transmits the above described current position information of the revolver 104 to the PC 119 (step 65) and the process returns to step 64. Incidentally, an alternative configuration may be such that, if there is no response to a current position command for a certain period of time due to the fact that the power to the PC 119 is turned off or the application software is terminated, the main CPU 807 maintains the current position information in the built-in memory and transmits it along with the command that is transmitted in the above described step 53.

With the above described flow, even if the application is in a suspend state, or if the power to the PC 119 is turned off or the application software is terminated, the observation apparatus 1 is in the power save mode, in which the CPUs and I/F units are operable, and therefore it is possible to detect a change in the current position by carrying out the above described process even if the observer has manually moved an electrically driven unit.

Based on the above description, the present embodiment 2 provides a effect similar to the case of embodiment 1. That is, when the application software is started in the state in which the observation apparatus 1 is in the power save mode, there is no need to carry out an initializing operation of the observation apparatus 1 and therefore it is possible to start an observation right away. It is also possible to manage a state in which an electrically driven unit of the microscope is manually moved while the switch units and the like are turned off (in the power save mode).

Furthermore, the present embodiment 2 also enables an individual control for each control circuit board. For example, when shifting to the power save mode, an individual control is enabled, e.g., only the Z stage motor 110 is supplied with power by not transmitting a switch open message only to the node CPU 811(a) (not transmitting an all node-enabled message in this case).

The following is a description of a preferred embodiment 3. Note that the same component signs are assigned to the same configurations as those of embodiment 1 and duplicate descriptions are not provided here.

FIG. 12 is a diagram showing the electrical configuration of an observation apparatus 1 according to a preferred embodiment 3.

In the configuration shown in FIG. 12, an AC/DC converter 1201 connected to the AC cable 208 comprises a remote switch 1202 that is connected to the port 212 of the CPU 201. Further, the output on the secondary side (simply noted as "secondary output" hereinafter) of the AC/DC converter 1201 supplies the Z stage motor 110, revolver motor 107, and light source I/F 204(c) with the power as a motor/lamp-use power source 1203.

Meanwhile, a logic-use power source 1204 to be used for the CPU 201 and the like is supplied from the PC 119. That is, the logic-use power source 1204 is supplied from the PC 119. That is, the logic-use power source 1204 is supplied from the PC 119 to the CPU 201, RAM 202, ROM 203 and individual I/Fs 204 (i.e., the revolver I/F 204(a) and Z stage I/F 204(b)) by way of the aforementioned power supply-use power line, and further to sensors (i.e., the Z stage sensor 120, revolver sensor cluster 108 and the like) directly or by means of the respective I/Fs 204.

Incidentally, the dotted line arrow vested with the reference number 1204 in FIG. 12 may be regarded as the power supply-use power supply line used for logic (that is, regarded as a logic-use power supply-use power supply line 1204). A similar meaning is applied to the dotted line arrow vested with the reference number 1203.

Therefore, the present embodiment 3 is configured such that the observation apparatus 1 (i.e., the control unit 2) is not required to generate a logic-use power source 1204, and such that it is supplied even if the application software is terminated or in a suspend state, provided that the power to the PC 119 is kept turned ON.

The PC 119 has a command for changing the output of the port 212 of the CPU 201 so that, when a command for turning the port of the CPU 201 to L is transmitted and the command is received by the CPU 201 by way of the serial I/F 206, the CPU 201 turns the port 212 to L. With this operation, the secondary output of the AC/DC converter 1201 is turned ON and thereby the individual motors 107 and 110, and the light source 111, are supplied with the motor/lamp-use power source 1203.

Likewise, when the PC 119 transmits a command for turning the port to H and the CPU 201 receives the command, the CPU 201 turns the port 212 to H. With this operation, the secondary output of the AC/DC converter 1201 is turned OFF, and the individual motors 107 and 110, and the light source 111, are no longer supplied with the motor/lamp-use power source 1203.

Figure 13:
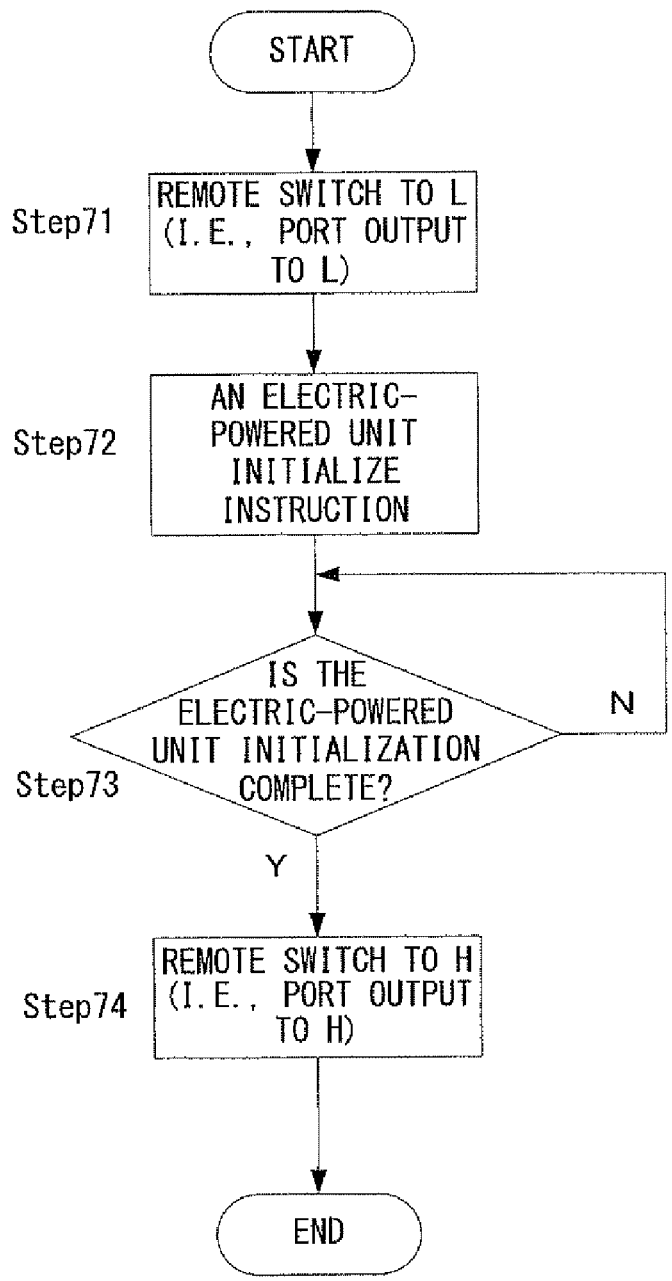

Next is a description of the operation of the CPU 201 when the power is turned on to the observation apparatus 1 according to the present embodiment 3 with reference to the flow chart shown in FIG. 13.

When the power to the observation apparatus 1 is turned on, the CPU 201 first turns the port 212 to L to supply the respective motors and light source with the motor/lamp-use power source 1203 (step 71). In this event, the indicator 213 is turned on.

Turning the port 212 to L, the input to the remote switch 1202 is turned to L, thereby the respective motors and light source are supplied with the motor/lamp-use power source 1203.

Then the CPU 201 issues an initialize command to the respective I/Fs 204 (step 72).

Following the issuance of the initialize command, the CPU 201 checks the individual I/Fs 204 to wait for the initialization to be completed, and, when the initialization is complete ("Y" for step 73), turns the port 212 to H in order to shut off the motor/lamp-use power source 1203 (step 74), and exits the present flow. In this event, the indicator 213 is turned off.

With the above described flow, the observation apparatus 1 terminates the initialization and waits, at the initialization complete position, for the application software to be started, in the state (i.e., the power save mode) in which neither the individual motors 107 and 110 nor the light source 111 is supplied with the power.

Further, the CPU 201 and the individual I/F units 204 are supplied with the power in the power save mode, and therefore it is possible to recognize (detect) the position information of the motors after the initialization.

As for the operations related to the application being started and terminated, and the shift to a suspend state and return there from, a motor/lamp-use power source ON/OFF command is available from the PC 119 (i.e., the application software), which is similar to the suspend instruction command and the observation apparatus connect command, both according to embodiment 1, and therefore a supply ON/OFF control for the motor/lamp-use power source 1203 corresponding to the events, that is, when the application is started or terminated, and when shifted to a suspend state or returned therefrom, can be attained by turning the input to the remote switch 1202 to H or L after the CPU 201 receives any of the aforementioned commands.

The above described embodiment 3 is configured to supply the logic-use power source from the PC 119, thereby making it possible to realize a effect similar to that of embodiment 1 with a configuration requiring no switch unit 211. In other words, the present embodiment 3 provides, in addition to effects similar to those of embodiment 1, the effect of simplifying the configuration because there is no need to comprise a switch unit 211. There is also the effect that the AC/DC converter is no longer required to generate a logic-use power.

Embodiment 3 is configured to essentially perform a process similar to what embodiment 1 does. However, the present embodiment 3 is configured to control the AC/DC converter 1201 without an intervention of the switch unit 211, and therefore the operation is different in terms of this aspect. That is, in the process of FIG. 13, the processes of the above described steps 71 and 74 are carried out in place of steps 1 and 4 shown in FIG. 4; and in other processes, the process of step 71 or 74 is carried out in relation to the supply ON/OFF control for the motor/lamp-use power source 1203. Otherwise the process is similar to the case of the above described embodiment 1 and therefore they are not shown in a drawing, nor is a duplicate description provided here.

Note that the Z stage, revolver and light source are defined as electrically driven units in embodiments 1 and 2, whereas the definition is arbitrary here.

Embodiment 2 is configured to place a power supply line in the circuit board of each electrically driven unit; the power supply line, however, may be placed in the control unit. This configuration makes it possible to attain a simple configuration.

Further, embodiment 2 is configured to merely open the switch unit when a switch open message is received, whereas it is alternatively possible to set the node CPU to be a power save mode in which a sensor signal is assigned to the interrupt port of the node CPU so that an interrupt signal is generated when the observer manually moves a component, prompting the CPU to return from the power save mode. Such a control makes it possible to further save power consumption.

Further, embodiment 2 may be alternatively configured to connect the node CPU port to the indicator.

Further, embodiment 2 is configured to issue a switch unit open instruction to all electrically driven units; alternatively, the configuration may be to issue the instruction only to a specific unit or units. Additionally, the node CPU may be programmed to ignore an open instruction. Such a control makes it possible to specify a unit to cut off the power therefrom.

Furthermore, embodiments 1 and 2 are configured to open the switch unit using a suspend instruction from the application software; an alternative configuration may be such that the CPU autonomously opens the switch if a command is not received for a certain period of time.

What is claimed is:

1. An observation system comprising an observation apparatus and an operation apparatus, with the observation apparatus and operation apparatus each having a power source unit, wherein the operation apparatus comprises an operation unit for remotely controlling the observation apparatus, and
the observation apparatus comprises
at least one electrically driven unit,
a control unit for controlling the electrically driven unit,
a first power supply line used for supplying the electrically driven unit with electric power from the power source unit,
a switch unit which is equipped on the first power supply line and is used for turning on or off power supply to the electrically driven unit,
a second power supply line used for supplying the control unit with electric power from the power source unit, wherein
the control unit supplies the electrically driven unit with electric power by turning on the switch unit at startup and executing an initialization process for the electrically driven unit, then stops the electric power supply to the electrically driven unit by turning off the switch unit, and then controls an on/off changeover of the switch unit in accordance with the state of the operation unit.

2. The observation system according to claim 1, wherein the control unit performs a control for turning on the switch unit in accordance with the startup of the operation unit.

3. The observation system according to claim 1, wherein the control unit performs a control for turning off the switch unit in accordance with a termination of the operation unit.

4. The observation system according to claim 1, wherein the control unit performs control for turning off the switch unit when the operation unit shifts to a pause state, and performs control for turning on the switch unit when the operation unit returns from the pause state.

5. The observation system according to claim 1, wherein the control unit monitors a change in the position information of an electric part in the state of the switch unit being Off and, if there is a change therein, transmits post-change position information to the operation unit when performing control for turning on the switch unit.

6. An observation system comprising an observation apparatus and an operation apparatus, with the observation apparatus and operation apparatus each having a power source unit, wherein the operation apparatus comprises an operation unit for remotely controlling the observation apparatus, and
the observation apparatus comprises
at least one electrically driven unit;
control units which are each equipped correspondingly to each of the electrically driven units and are each constituted by a first power supply line used for supplying the electrically driven unit with electric power, a switch unit which is equipped in the first power supply line and is used for turning on or off the power supply to the electrically driven unit, and a controller unit for controlling the electrically driven unit and also controlling for turning on or off the switch unit;
a main control unit for communicating with the operation apparatus and each of the controller units; and
a second power supply line used for supplying the controller unit and main control unit with electric power, wherein the main control unit transmits an on-instruction and an initialize instruction to at least one of the controller units to on-control the switch unit in order to cause the controller unit(s) to supply the electrically driven unit(s) with electric power and also to perform an initialization process for the electrically driven unit(s) at startup, and thereafter, transmits an off-instruction to the controller unit(s) to cause it to perform an off-control on the switch unit in order to stop the power supply to the electrically driven unit(s), and thereafter, transmits the on-instruction/off-instruction to at least one of the controller units in accordance with the state of the operation unit, thereby causing the controller unit(s) to perform the on/off changeover control for the switch unit.

7. The observation system according to claim 6, further comprising
a sensor for detecting the position of an electric part as a target to be driven by the electrically driven unit, wherein
the controller unit obtains position information detected by the sensor at any time in the state of the switch unit being Off and, if there is a change in the position information, notify the change to the main control unit.

8. An observation system comprising an observation apparatus and an operation apparatus, with the observation apparatus and operation apparatus each having a power source unit, wherein
the operation apparatus comprises an operation unit for remotely controlling the observation apparatus, and
the observation apparatus comprises
at least one electrically driven unit,
a control unit for controlling the electrically driven unit,
a first power supply line used for supplying the electrically driven unit with electric power from a power source unit comprised in the observation apparatus, and
a second power supply line used for supplying the control unit with electric power from the operation apparatus, wherein
the control unit on-controls the power source unit so as to cause it to supply the electrically driven unit with electric power, and also executes an initialization process for the electrically driven unit at startup, and then off-controls the power source unit to cause it to stop supplying the electrically driven unit with electric power, and thereafter, on/off-controls the power source unit in accordance with the state of the operation unit.

9. An observation apparatus remotely operated by an instruction from an operation apparatus comprising an operation unit, the observation apparatus comprising:
at least one electrically driven unit;
a control unit for controlling the electrically driven unit;
a power source unit used for externally supplying electric power;
a first power supply line used for supplying the electrically driven unit with electric power from the power source unit;
a switch unit which is equipped in the first power supply line and is used for turning on or off the power supply to the electrically driven unit; and
a second power supply line used for supplying the control unit with electric power from the power source unit, wherein the control unit supplies the electrically driven unit with electric power by turning on the switch unit at startup and executes an initialization process for the electrically driven unit at startup, then stops the electric power supply to the electrically driven unit by turning off the switch unit, and then controls an on/off changeover of the switch unit in accordance with the state of the operation unit.

10. An observation apparatus remotely operated by an instruction from an operation apparatus comprising an operation unit, the observation apparatus comprising:
at least one electrically driven unit;
a power source unit used for externally supplying electric power;
control units which are each equipped correspondingly to each of the electrically driven units and are each constituted by a first power supply line used for supplying the electrically driven unit with electric power, a switch unit which is equipped in the first power supply line and is used for turning on or off the power supply to the electrically driven unit, and a controller unit for controlling the electrically driven unit and also controlling for turning on or off the switch unit;
a main control unit for communicating with the operation apparatus and each of the controller units; and
a second power supply line used for supplying the controller unit and main control unit with electric power, wherein
the main control unit transmits an on-instruction and an initialize instruction to at least one of the controller units to on-control the switch unit in order to cause the controller unit(s) to supply the electrically driven unit(s) with electric power and also to perform an initialization process for the electrically driven unit(s) at startup, and thereafter, transmits an off-instruction to the controller unit(s) to cause it to perform an off-control the switch unit in order to stop the power supply to the electrically driven unit(s), and thereafter, transmits the on-instruction/off-instruction to at least one of the controller units in accordance with the state of the operation unit, thereby causing the controller unit(s) to perform the on/off changeover control for the switch unit.

11. An observation apparatus remotely operated by an instruction from an operation apparatus comprising an operation unit, the observation apparatus comprising:
at least one electrically driven unit;
a control unit for controlling the electrically driven unit;
a power source unit used for externally supplying electric power;
a first power supply line used for supplying the electrically driven unit with electric power from the power source unit; and
a second power supply line used for supplying the control unit with electric power from the operation apparatus, wherein
the control unit on-controls the power source unit so as to cause it to supply the electrically driven unit with electric power, and also executes an initialization process for the electrically driven unit at startup, and then off-controls the power source unit to cause it to stop supplying the electrically driven unit with electric power, and thereafter, on/off-controls the power source unit in accordance with the state of the operation unit.

* * * * *